United States Patent [19]

Schroeder

[11] Patent Number: 5,134,913
[45] Date of Patent: Aug. 4, 1992

[54] SLITTING MACHINE FOR TRAVELLING WEBS

[75] Inventor: Lothar Schroeder, Altenmoor, Fed. Rep. of Germany

[73] Assignee: Peters Machinenfabrik GmbH, Fed. Rep. of Germany

[21] Appl. No.: 658,785

[22] Filed: Feb. 21, 1991

[30] Foreign Application Priority Data

Feb. 21, 1990 [CH] Switzerland .................. 00566/90

[51] Int. Cl.⁵ .......................... B26D 1/16; B26D 7/08
[52] U.S. Cl. ........................................ 83/169; 83/171;
83/491; 83/564
[58] Field of Search ............... 83/169, 171, 431, 491,
83/499, 564

[56] References Cited

U.S. PATENT DOCUMENTS

| 2,796,933 | 6/1957 | DeGelleke . | |
| 3,543,623 | 12/1970 | Wirstroem | 83/169 |
| 3,703,915 | 11/1972 | Pearson | 83/169 |
| 3,816,875 | 6/1974 | Duncan et al. | 83/169 |
| 4,230,005 | 10/1980 | Varga | 83/169 |
| 4,506,577 | 3/1985 | Shinomiya et al. | 83/499 |
| 4,729,193 | 3/1988 | Gant et al. | 83/666 |

FOREIGN PATENT DOCUMENTS

| 2839098 | 3/1980 | Fed. Rep. of Germany . |
| 2495989 | 6/1982 | France . |
| 600026 | 6/1978 | Switzerland . |
| 1447620 | 8/1976 | United Kingdom . |
| 2072563 | 10/1981 | United Kingdom . |

Primary Examiner—Hien H. Phan
Attorney, Agent, or Firm—Hill, Van Santen, Steadman & Simpson

[57] ABSTRACT

A machine which is constructed for slitting travelling webs, such as corrugated boards or similar material, characterized by a slitting tool with the shape of a thin rotary blade, which is provided with a cutting peripheral edge. The rotary blade is contained within a holder so that only a small portion of the cutting edge will emerge from a narrow slot in a wall of the holder, which wall is placed very close to the path of the web. The holder also contains a liquid for cooling and lubricating the rotary blade.

9 Claims, 3 Drawing Sheets

SLITTING MACHINE FOR TRAVELLING WEBS

BACKGROUND OF THE INVENTION

The present invention is concerned with a device for slitting travelling webs, such as corrugated board, which device comprises a slitting tool having a shape of a thin rotary blade with a peripheral cutting edge.

Up to now, devices used for slitting travelling webs of corrugated board or similar material contain a tool and a tool counterpart both having the shape of a disk.

The tool is fitted on a first rotary shaft and the tool counter-part on a second rotary shaft that extends parallel to the first shaft. Both shafts are arranged to extend perpendicular to the web travelling direction and are spaced from one another so as to enable the tool and the counter-part to have a small peripheral portion of their disk pressing against one another with a view to have the web slitted with the action similar to one of shears. Generally, the peripheral speed of the two disks is identical with and, as a rule, higher than the speed of the travelling web. If necessary, several tools and counter-parts can be arranged to extend crosswise over the web to be slit to slit the web in selected widths. Similarly, their position can be adjusted according to the requirements of the desired width for each web.

However, the slitting devices according to the prior art, which are equipped with tool and counter-part cutting the web in a way identical with the action of a pair of shears, have several drawbacks. For example, these are a failure to insure a smooth and burrless cutting of the travelling web and creation along the slit of relatively voluminous hairlike fluffy and plushy remnants, which will then spread on a flat surface of the web to form a layer of dust harmful to certain subsequent surface treatment operations, especially to a flexographic printing process.

SUMMARY OF THE INVENTION

The object of the present invention is to provide a slitting device for a travelling web without the drawbacks described hereinabove. This is accomplished in an improvement in a device designed for slitting travelling webs, such as corrugated board or similar materials, which device comprises a slitting tool having a shape of a thin rotary blade with a peripheral cutting edge. The improvements are that the rotary blade is fitted in a holder or housing which allows only a small portion of the cutting edge to extend through a narrow slot in a wall of the holder or housing, which wall is located very close to the web to be slit, the holder or housing containing a liquid for cooling and lubricating the rotary blade and being provided with means for driving the rotary blade.

Other advantages and features of the invention will be readily apparent from the following description of the preferred embodiments, the drawings and claims.

DESCRIPTION OF THE PREFERRED EMBODIMENTS

Figure 1:
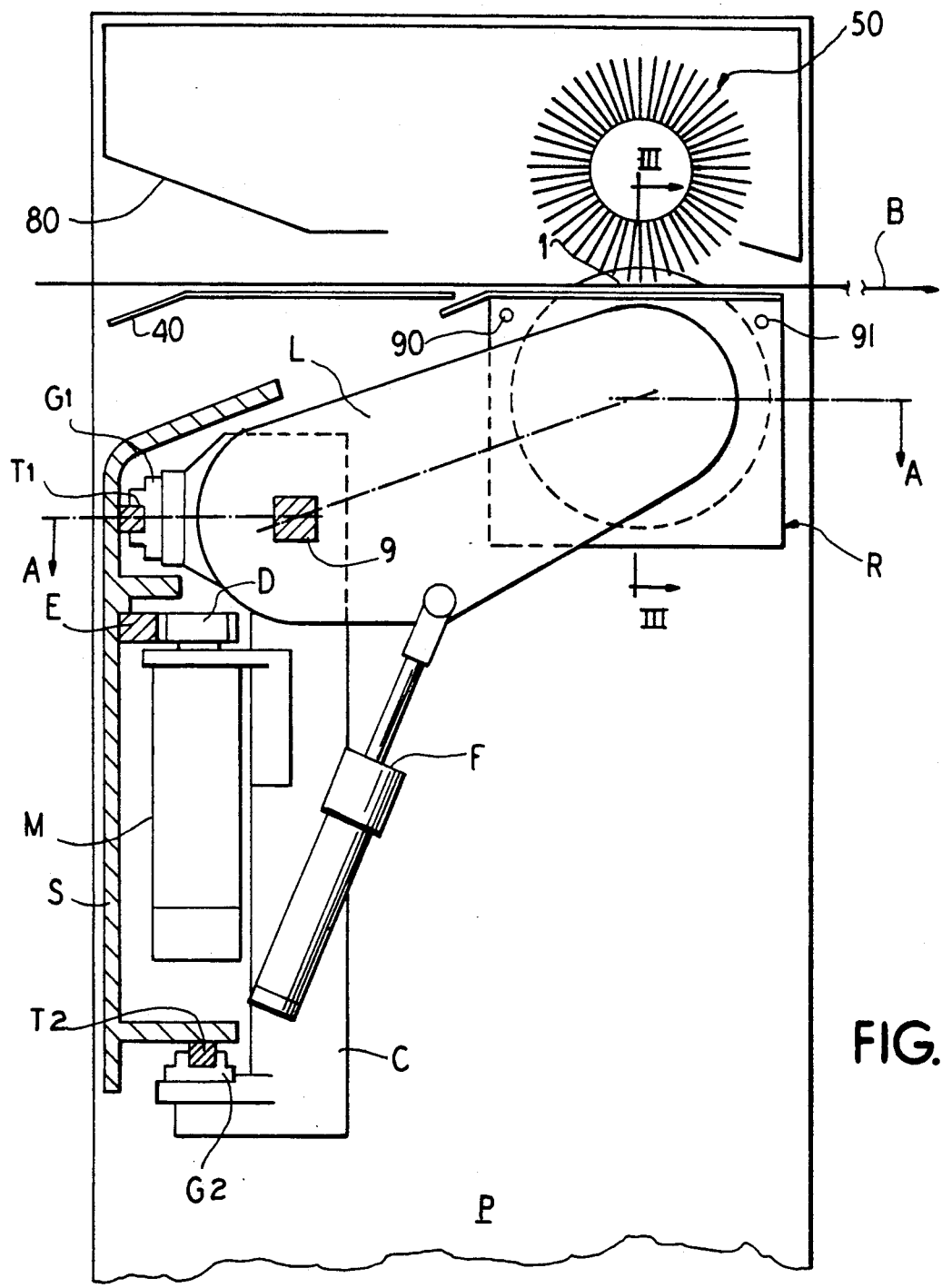
FIG. 1 represents a cross sectional view of a machine designed for slitting travelling webs according to the present invention.

The principles of the present invention are particularly useful when incorporated in a device illustrated in FIG. 1 for slitting a travelling web B which is moving in a direction of the arrow. The slitting is a lengthwise cutting action parallel to the travelling direction of the web. To this aim, a slitting tool 1 is fitted on one of the slitting devices R, which are arranged along a transverse axis and along the width of the web B. The machine includes a main support S which extends transverse to the direction of movement of the web and is provided with two crosswise rails or tracks T1 and T2 and a rack bar E. The main support S is fitted on the side walls P (only one being shown in FIG. 1) between which side walls the web B is to travel. Every slitting device R is fitted on a first end of a tilting lever L, the other end of which is mounted for pivoting on a carriage C which can be moved along an axis extending perpendicular to the plane of FIG. 1. As illustrated, the carriage C has sliding guides G1 and G2 which engage rails or tracks T1 and T2 of the main support S. A motor M mounted on the carriage C will shift the carriage along the rails and has a gear D engaged on the rack bar or rack gear E. Thus, rotation of the motor will shift the carriage C in a direction extending perpendicular to the direction of movement of the web. The tilt of the lever L is achieved by means of a pneumatic jack F, which is arranged to extended between the carriage C and the lever L. The assembly consisting of the lever L, carriage C and pneumatic jack F is placed in such a way as to allow a movement of the slitting device R between a first operation position in which its tool 1 can slit the web B and a second, so-called rest position, in which the tool is entirely withdrawn from the path of the web B.

The tool 1, properly speaking, consists of a thin steel blade with a thickness of up to 0.8 mm, of which the periphery, after sharpening or not, it tapered so as to form a cutting edge. The circular blade can be made of a material selected from a group consisting of steel, ceramic or a plasma-treated steel or an otherwise-treated steel. The circular blade 1 (see FIGS. 2 and 3) is held between two disk-shaped jaws 2 and 3, which have an axis which is identical with the one of the circular blade, although the diameter of each of the jaws 2 and 3 is smaller than the diameter of the blade. As best illustrated in FIG. 3, a shaft 7 is mounted by a pair of roller bearings 60 in a bore 6 of a free end of the tilting lever L. The shaft 7 has a length so that it allows the two ends to protrude from the tilting lever L. The first end of the shaft 7 serves as a support for the two jaws 2 and 3 and the circular blade 1, with each of the jaws being provided with an adequate aperture for receiving the shaft. At the first end, the shaft has a step configuration formed by an annular collar 71, a threaded portion 72 and an intermediate portion 73. The first disk 3 has an aperture of the same diameter as the portion 73 and is received on the portion 73 and against a shoulder formed by the collar 71. To prevent relative rotation between the disk 3 and the shaft, it is keyed to the collar. As illustrated, this is accomplished by a pin 3a extending between aligned bores in the collar 71 and disk 3. Preferably, there are three pins angularly arranged around the axis of the shaft. The blade 1 has an orifice of a size to allow it to rest on the portion 73 and the other or second jaw 2 is threaded on the portion 72 to press the blade between the two jaws. This will achieve a final interlocking of the rotation of the circular blade with regard to the shaft 7.

The shaft 7, at an end opposite to the threaded portion 72, has a portion which is keyed to a gear 8. The gear 8 receives a toothed belt 11 to form a portion of the drive for the blade 1.

Figure 2:
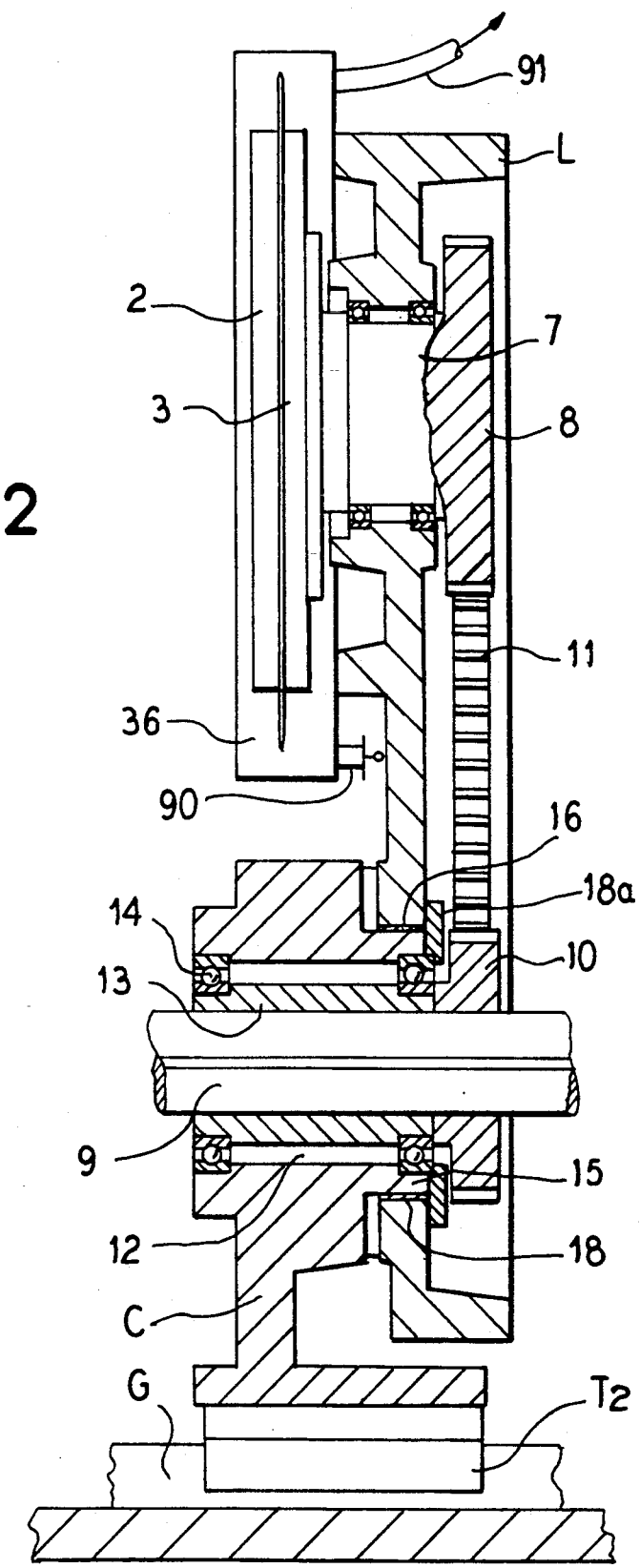
FIG. 2 is a cross sectional view with portions in elevation for purpose of illustration taken along the lines A—A of FIG. 1.
Figure 3:
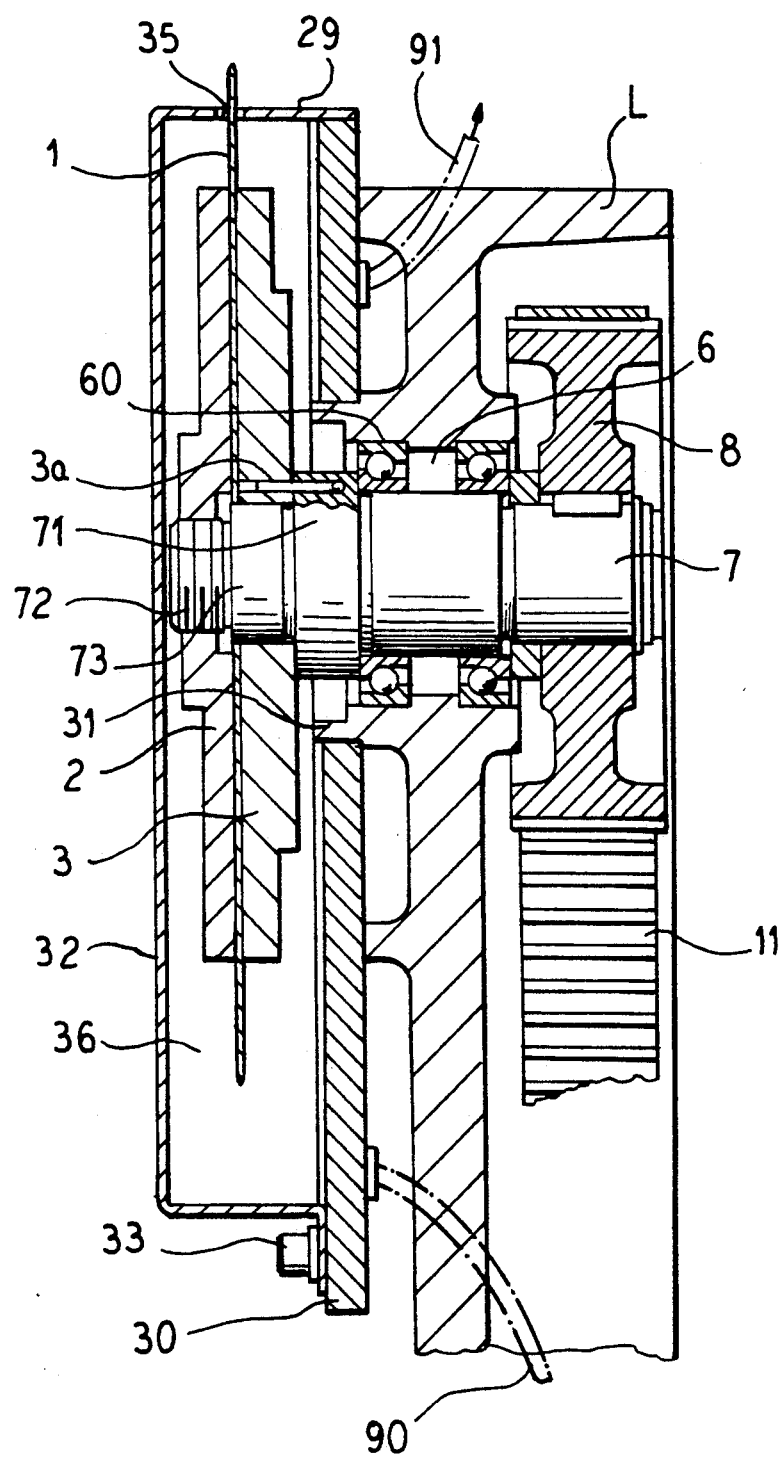
FIG. 3 is an enlarged, more detailed cross sectional view taken along lines III—III of FIG. 1.

As best illustrated in FIG. 2, the pivoting axle of the lever L is identical with one of the crosswise square section transmission shafts 9, which extends perpendicular to the direction of the travel for the web B. The shaft 9 is fitted for free rotation in two bearings (not illustrated), which are provided on each of the two side walls P. The transmission shaft 9 is driven, at least at one of its ends, by means not illustrated. The shaft 9 is equipped with a non-rotatable second toothed gear 10, which is connected by means of the toothed belt 11 to the gear 8.

The carriage C is provided with a bore 12, which receives a bushing 13 which is mounted for rotation in the bore 12 by a pair of ball bearings 14. The bushing 13 is provided with a non-circular or a square opening enabling a free sliding movement along the transmission shaft 9. The carriage is also provided with a cylindrical hub 15 on the axis of the opening 12 and, thus, the axis of the shaft 9. The hub 15 is received in an aperture 18 of the lever 11. A bearing shell 16 is arranged between the hub 15 and the aperture 18 and the lever is held on the hub by means of a washer 18a.

As illustrated in FIG. 3, a plate 30 of a square shape is centered on the transmission shaft 7 and is mounted on the tilting lever L within the space contained between the lever and a first jaw 3. To accomplish this, the lever L has a hub 31 with a cylindrical part of surface which receives an aperture provided in the plate 30. A lid 32 of a square shape and rectangular section is secured by screws 33 onto the plate 30. The shaft and arrangement of the plate 30 and of the lid 32 are such that these two parts make up a housing or holder with a chamber 36 surrounding entirely the rotary blade, with the exception of a small portion of the blade, which extends through a thin slot 35 of an upper wall 29 of the lid 32. The rotary blade 1 will protrude from the lid 32 to a height of, for instance, 1.5 to 3 times the thickness of the web B which is to be slit.

As shown in FIG. 1, the web is supported in the slitting area only by an upper wall 29 of the lid 32. On the other hand, a guide plate 40 can be provided upstream of the slitting device R. Immediately above the rotary blade 1, it is possible to add a rotary brush 50 with a length equal to the width of the web B. The brush 50 is designed to exert a slight pressure on the web B to urge it toward the upper wall 29 of the housing forming the chamber 36. The chamber 36 contains a cooling fluid, such as water of similar liquid. which will cool the blade 1, which has a strong tendency to heat up by rubbing effect during the slitting operation. The cooling fluid has the additional function of being a lubricant between the blade 1 and the web B.

Tests have shown that if the blade 1 rotates in a direction opposite to the direction of travel for the web B, its peripheral speed can be kept steady, even with an increased speed of the travelling web B. On the other hand, if the cutting blade 1 rotates in the same direction as the direction of the travel of the web B, its peripheral speed, which exceeds the web motion, is to be increased when the rate of the web travel increases. In both cases, however, the peripheral speed of the rotary blade is faster than the one generally used up to now for slitting tools and their counter-parts, according to the prior art, and can reach even treble of the travelling speed of the web with the blade 1 rotating in the same direction as the web's travel. It is also possible to quintuple the speed if it rotates in a direction opposite to the travelling motion of the web.

The chamber 36 of the housing is equipped with means to insure a supply of the coolant to and from the chamber. As illustrated, this can be accomplished by a supply line 91 and a flow-off or exhaust line 92. Similarly, within the space where the cutting blade 1 emerges from the housing forming the chamber 36, it is possible to add a sort of scraper (not illustrated) which is to remove residual glue from the blade, which glue results from the slitting of the corrugated web consisting of various layers glued to one another. Similarly, it is possible to add, above the web B, a holder 80 designed to contain the rotary brush 50, which would prevent spilling of the coolant likely to spout through the slot 35. Inside the holder, the coolant should preferably be kept at a temperature below the melting point for the glue of the corrugated board.

Although various minor modifications may be suggested by those versed in the art, it should be understood that I wish to embody within the scope of the patent granted herein all such modifications as reasonably and properly come within the scope of my contribution to the art.

I claim:

1. A device for slitting a web of material traveling in a direction through said device, said device comprising:
    a lever arm mounted at a first end to a frame for pivotable movement relative to said frame;
    a rotary blade having a side face and a peripheral cutting edge;
    drive means for rotating said rotary blade;
    a container surrounding said rotary blade and having a slot through which said peripheral cutting edge is exposed for slitting said web, said container containing liquid for cooling and lubricating said blade and having an opening in a side thereof;
    said drive means and said container being attached to opposite sides of a second end of said lever arm;
    a drive connection extending through said lever arm and said opening and being attached to said side face of said blade so that said drive means is isolated from said liquid; and
    means for pivoting said lever arm to move said container with said drive means and said rotary blade between a first position with said rotary blade in contact with said web and a second position with said rotary blade out of contact with said web.

2. A device according to claim 1 wherein said drive connection comprises a rotary shaft having a first end which penetrates into the container and which is fitted with two non-rotary jaws having the shape of circular disks for gripping the rotary blade, one of the jaws being pushed against the other jaw when threaded onto a threaded portion of the shaft.

3. A device according to claim 2, wherein the blade consists of a material selected from a group consisting of steel, ceramic, plasma-treated steel and other treaded steels, said blade having a thickness of less than 0.8 mm.

4. A device according to claim 1, wherein the blade has a thickness of less than 0.8 mm and consists of a material selected from a group consisting of steel, ceramic, treated steel and plasma-treated steel.

5. A device according to claim 1, wherein said drive means comprises a drive gear mounted at said second end of said lever arm, a drive shaft, forming said drive connection, mounted at the first end of said lever arm, said drive shaft having a spur gear connected to the drive gear by a toothed belt.

6. A device according to claim 1 further comprising: a carriage attached to said lever arm, said carriage having a guide thereon, a transverse support having at least one guide track engaging said guide of the carriage, a rack extending along said traverse support engaging a gear on a drive motor mounted on said carriage so that rotation of said gear by said drive motor shifts the carriage along said guide track and perpendicularly to the direction of movement of the web.

7. A device according to claim 6, wherein the carriage has a cylindrical hub extending in a direction transverse to the direction of the web, said lever arm having a bore provided with a bearing received on said cylindrical hub so that the lever arm can rotate therearound, said hub having a bore extending therethrough containing a bushing mounted for rotation in the hub, said bushing having a non-circular bore receiving a transmission shaft having a cross section similar to the non-circular bore so that the transmission shaft is free to rotate to the lever arm and the carriage and lever arm can be shifted axially along said transmission shaft.

8. A device according to claim 1, wherein said container comprises a plate fitted on the lever arm and centered around the axis of rotation of the rotary blade, a lid having shapes and dimensions of the plate secured to the plate, said lip having a wall with a slot therein through which a small portion of the blade protrudes adjacent to a path of the web so that said wall supports the web in a slitting area.

9. A machine according to claim 1, further comprising means for circulating said liquid through the container.

* * * * *